United States Patent
Omote et al.

(10) Patent No.: US 9,194,277 B2
(45) Date of Patent: Nov. 24, 2015

(54) EXHAUST MANIFOLD

(75) Inventors: Hiroshi Omote, Osaka (JP); Takayuki Onodera, Osaka (JP)

(73) Assignee: Yanmar Co., Ltd., Osaka (JP)

( * ) Notice: Subject to any disclaimer, the term of this patent is extended or adjusted under 35 U.S.C. 154(b) by 355 days.

(21) Appl. No.: 13/643,489

(22) PCT Filed: Apr. 19, 2011

(86) PCT No.: PCT/JP2011/059628
§ 371 (c)(1),
(2), (4) Date: Oct. 25, 2012

(87) PCT Pub. No.: WO2011/136088
PCT Pub. Date: Nov. 3, 2011

(65) Prior Publication Data
US 2013/0037009 A1   Feb. 14, 2013

(30) Foreign Application Priority Data
Apr. 28, 2010  (JP) .................... 2010-104267

(51) Int. Cl.
*F02M 25/07* (2006.01)
*F01N 13/10* (2010.01)

(52) U.S. Cl.
CPC .......... *F01N 13/10* (2013.01); *F02M 25/0717* (2013.01); *F02M 25/0703* (2013.01);
(Continued)

(58) Field of Classification Search
CPC .......... F02M 25/0749; F02M 25/0747; F02M 25/0717; F02M 25/0715; F02M 25/07; F02M 25/07; F02M 25/0707; F02M 25/0712; F02N 13/00–13/107
USPC ............. 123/568.11, 568.12, 568.17, 568.21, 123/445, 478, 90.15, 184.21, 435, 446, 123/184.53, 193.3, 193.5, 25 C, 299, 349, 123/399, 41.02, 41.08, 41.47, 436, 568.28; 60/323, 605.2, 273, 274, 278, 602, 60/324, 325; 701/108
See application file for complete search history.

(56) References Cited

U.S. PATENT DOCUMENTS 6,256,990 B1 *  7/2001  Itoh ................................ 60/597
6,360,532 B2 *  3/2002  Strahle et al. ................... 60/321
(Continued)

FOREIGN PATENT DOCUMENTS

| JP | H06-40343 U | 5/1994 |
| JP | H09-004447 A | 1/1997 |

(Continued)

OTHER PUBLICATIONS

International Search Report for Application No. PCT/JP2011/059628, Japanese Patent Office, mailed Jun. 6, 2011, 4 pages.
(Continued)

*Primary Examiner* — Stephen K Cronin
*Assistant Examiner* — Brian Kirby
(74) *Attorney, Agent, or Firm* — Sterne, Kessler, Goldstein & Fox P.L.L.C.

(57) ABSTRACT

An exhaust manifold maintains the EGR ratio constant irrespective of a change in shape of the exhaust manifold and includes exhaust gas inlet sections connected to the exhaust ports of respective cylinders of the engine; a main pipe section configured so that exhaust gas entering from the exhaust gas inlet sections is collected inside the main pipe section; an EGR gas taking-out section for extracting, as EGR gas, a part of the exhaust gas; and an exhaust gas discharge section for discharging the exhaust gas. The main pipe section has formed thereon a curved section provided between the exhaust gas inlet sections and curved in a shape protruding to the side opposite the exhaust gas inlet sections. The curved section has a recess which is formed by causing a portion of the outer peripheral surface of the curved section to be recessed toward the inside of the main pipe section.

4 Claims, 12 Drawing Sheets

(52) U.S. Cl.
CPC ........ *F02M25/0707* (2013.01); *F02M 25/0712* (2013.01); *F02M 25/0715* (2013.01); *Y02T 10/121* (2013.01)

(56) References Cited

U.S. PATENT DOCUMENTS

| | | | | |
|---|---|---|---|---|
| 6,959,700 | B2* | 11/2005 | Wu et al. | 123/568.17 |
| 7,311,090 | B2* | 12/2007 | Lyons | 123/568.11 |
| 7,513,106 | B2* | 4/2009 | Owens | 60/278 |
| 7,926,460 | B2* | 4/2011 | Alizon et al. | 123/184.38 |
| 2005/0247294 | A1* | 11/2005 | Rowells | 123/568.17 |
| 2007/0068497 | A1* | 3/2007 | Sugimoto et al. | 123/568.12 |
| 2008/0098730 | A1* | 5/2008 | Owens | 60/323 |
| 2009/0139229 | A1* | 6/2009 | Frantzheld et al. | 60/602 |
| 2010/0154416 | A1* | 6/2010 | Bruce et al. | 60/605.2 |
| 2013/0061831 | A1* | 3/2013 | Gambhir et al. | 123/568.21 |

FOREIGN PATENT DOCUMENTS

| | | | | |
|---|---|---|---|---|
| JP | 2000-145444 | A | | 5/2000 |
| JP | 2004092442 | A * | 3/2004 | ............. F02M 25/07 |
| JP | 2005214157 | A * | 8/2005 | ......... F02M 25/0707 |
| JP | 2005214157 | A * | 8/2005 | ......... F02M 25/0707 |
| JP | 2006-132408 | A | | 5/2006 |
| JP | 2007-177693 | A | | 7/2007 |
| JP | 2009-281333 | A | | 12/2009 |
| JP | 2009281333 | A * | 12/2009 | ............. F01N 13/00 |
| JP | 2009283999 | A * | 12/2009 | ............. F01N 10/13 |

OTHER PUBLICATIONS

International Search Report for Application No. PCT/JP2011/059628, Japanese Patent Office, mailed, 4 pages.
International Search Report for Application No. PCT/JP2011/059628, Japanese Patent Office, mailed Jun. 28, 2011, 4 pages.

* cited by examiner

EXHAUST MANIFOLD

TECHNICAL FIELD

The present invention relates to structure of an exhaust manifold having an EGR gas taking-out section.

BACKGROUND ART

Conventionally, a small internal combustion engine such as a diesel engine or a gasoline engine has high general-purpose properties and is employed for various purposes such as an agricultural machine, a construction machine and a ship (loaded machine). Accordingly, loading space of the internal combustion engine is various corresponding to the loaded machine, and the loading space of the internal combustion engine may be small.

In an internal combustion engine having a DPF (Diesel Particulate Filter) effective for dealing with regulation of exhaust gas, the ratio of the space for the DPF to the space for the whole internal combustion engine is large.

Therefore, different specifications are set about the loading position of the DPF in the internal combustion engine so as to follow the installation position and exhaust direction of the loaded machine.

Figure 12:
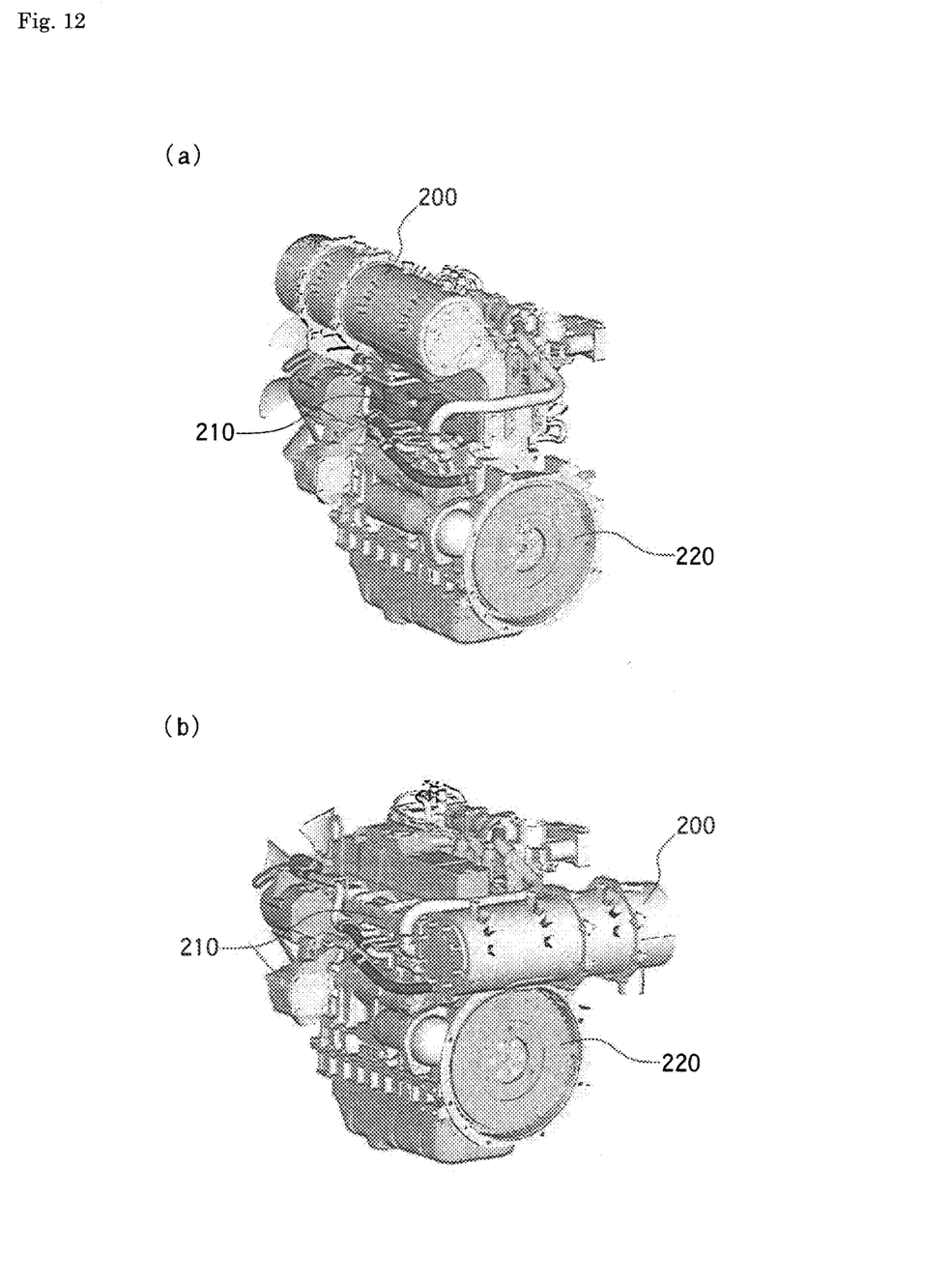
[FIG. 12] A perspective view of a loading position of a DPF in the internal combustion engine. (a) is a perspective view of the case in which the DPF is arranged above the exhaust manifold. (b) is a perspective view of the case in which the DPF is arranged above a flywheel.

For example, as the loading position of the DPF in the internal combustion engine, the construction in which a DPF 200 is arranged above a manifold 210 as shown in FIG. 12(*a*) and the construction in which the DPF 200 is arranged above a flywheel 220 as shown in FIG. 12(*b*) are provided.

When the loading position of the DPF is changed, the shape of the exhaust manifold is also changed.

For example, in the construction in which the DPF is arranged above the exhaust manifold (FIG. 12(*a*)), an exhaust outlet of the exhaust manifold must be directed upward, whereby the shape of the exhaust manifold as shown in the Patent Literature 1 is employed.

In the construction in which the DPF is arranged above the flywheel (FIG. 12(*b*)), the exhaust outlet of the exhaust manifold must be directed to the flywheel, whereby the shape of the exhaust manifold as shown in the Patent Literature 2 is employed.

Furthermore, as a measure for reducing NOx and the like discharged from the internal combustion engine, in addition to the DPF, a method is employed in which a part of exhaust gas discharged from the internal combustion engine is returned to the intake as EGR gas (EGR: Exhaust Gas Recirculation). In this method, mixture ratio of the exhaust gas (EGR gas) and new air (EGR ratio) is changed corresponding to the positional relation between an EGR taking-out section and an exhaust gas discharge section guiding exhaust gas to a silencer in the exhaust manifold.

PRIOR ART REFERENCE

Patent Literature

Patent Literature 1: the Japanese Patent Laid Open Gazette 2007-177693
Patent Literature 2: the Japanese Patent Laid Open Gazette 2006-132408

DISCLOSURE OF INVENTION

Problems to be Solved by the Invention

As mentioned above, when the position of the EGR taking-out section and the exhaust gas discharge section in the exhaust manifold is changed corresponding to the loading position of the DPF, the EGR ratio is also changed. Accordingly, there is a problem in that an operation program of a valve controlling the EGR ratio must be amended.

Therefore, the present invention provides an exhaust manifold in which an EGR ratio is substantially fixed when loading position of a DPF is changed.

Means for Solving the Problems

The above-mentioned problems are solved by the following means of the present invention.

According to the present invention, an exhaust manifold includes exhaust gas inlet sections connected to exhaust ports of cylinders of an engine, a main pipe section communicated with the exhaust gas inlet sections and collecting exhaust gas flowing from the exhaust gas inlet sections, an EGR gas taking-out section taking out a part of the collected exhaust gas as EGR gas, and an exhaust gas discharge section discharging the other part of the exhaust gas. In the main pipe section, a curved section projectingly curved oppositely to the exhaust gas inlet sections is formed between the exhaust gas inlet sections. In the curved section, a recess is formed by recessing a part of an outer peripheral surface of the curved section toward an inside of the main pipe section, and an EGR gas taking-out section is extendingly provided from a part of the outer peripheral surface opposite to the recess. A center of an inlet opening of the EGR gas taking-out section is offset from an axis in lengthwise direction of the main pipe section.

According to the present invention, a center of an opening of the exhaust gas discharge section is offset from the axis in the lengthwise direction of the main pipe section.

According to the present invention, the exhaust gas discharge section is provided at a center in the lengthwise direction of the main pipe section.

According to the present invention, the exhaust gas discharge section is provided at an end of the main pipe section oppositely to the EGR gas taking-out section.

Effect of the Invention

The present invention brings the following effects.

According to the present invention, the exhaust gas flowing into the EGR gas taking-out section is limited to the exhaust gas flowing from the specific exhaust ports. Accordingly, when the position of the exhaust gas discharge section in the exhaust manifold is changed and the shape of the exhaust manifold is changed, the change of the EGR ratio by the change of flow of the exhaust gas caused by the shape of the exhaust manifold can be reduced. Therefore, the EGR ratio is fixed regardless of the change of the shape of the exhaust manifold, whereby it is not necessary to change the EGR ratio control program though the shape of the exhaust manifold is changed. The exhaust manifold can be selected following the loaded position of the DPF in the internal combustion engine without changing the EGR ratio.

According to the present invention, the average exhaust pressure in the exhaust manifold can be fixed. Accordingly, the change of the amount of the EGR gas caused by the discharge direction of the exhaust gas can be reduced, whereby the amount of the EGR gas taken out from the EGR gas taking-out section can be stabilized regardless of the change of the shape of the exhaust manifold (the change of the position of the exhaust gas discharge section in the exhaust manifold).

According to the present invention, the average exhaust pressure in the exhaust manifold can be fixed. Accordingly, the change of the amount of the EGR gas caused by the discharge direction of the exhaust gas can be reduced, whereby the amount of the EGR gas taken out from the EGR gas taking-out section can be stabilized.

According to the present invention, the average exhaust pressure in the exhaust manifold can be fixed. Accordingly, the change of the amount of the EGR gas caused by the discharge direction of the exhaust gas can be reduced, whereby the amount of the EGR gas taken out from the EGR gas taking-out section can be stabilized.

Figure 1:
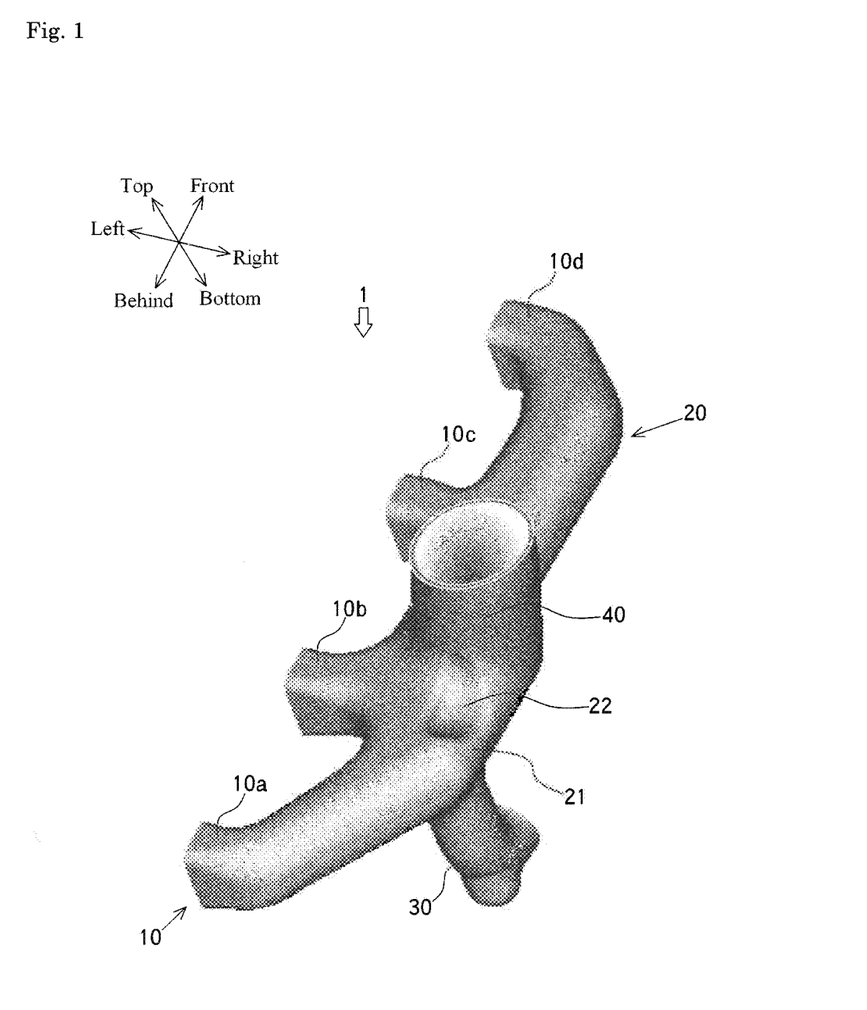
[FIG. 1] A perspective view of an exhaust manifold according to a first embodiment.

DESCRIPTION OF NOTATIONS 1 exhaust manifold
2 exhaust manifold
10 exhaust gas inlet section
20 main pipe section
21 curved section
30 EGR gas taking-out section
40 exhaust gas discharge section
50 exhaust gas inlet section
60 main pipe section
61 curved section
70 EGR gas taking-out section
80 exhaust gas discharge section Detailed Description of the Invention An explanation will be given on an exhaust manifold 1 according to the present invention. In below explanation, an internal combustion engine is a four-cylindered diesel engine (hereinafter, referred to as engine), and the exhaust manifold 1 attached to the four-cylindered diesel engine is explained. As shown in FIG. 1, the lengthwise direction of the exhaust manifold 1 is regarded as the longitudinal direction, and directions perpendicular to the lengthwise direction of the exhaust manifold 1 are respectively regarded as the vertical and lateral directions.

An explanation will be given on the exhaust manifold 1 according to a first embodiment of the present invention.

A DPF is disposed above the exhaust manifold 1 according to the first embodiment, and the axis (lengthwise direction) of the DPF is in parallel to an axis A (FIG. 2) of the exhaust manifold 1 (the same as FIG. 12(a)).

Figure 2:
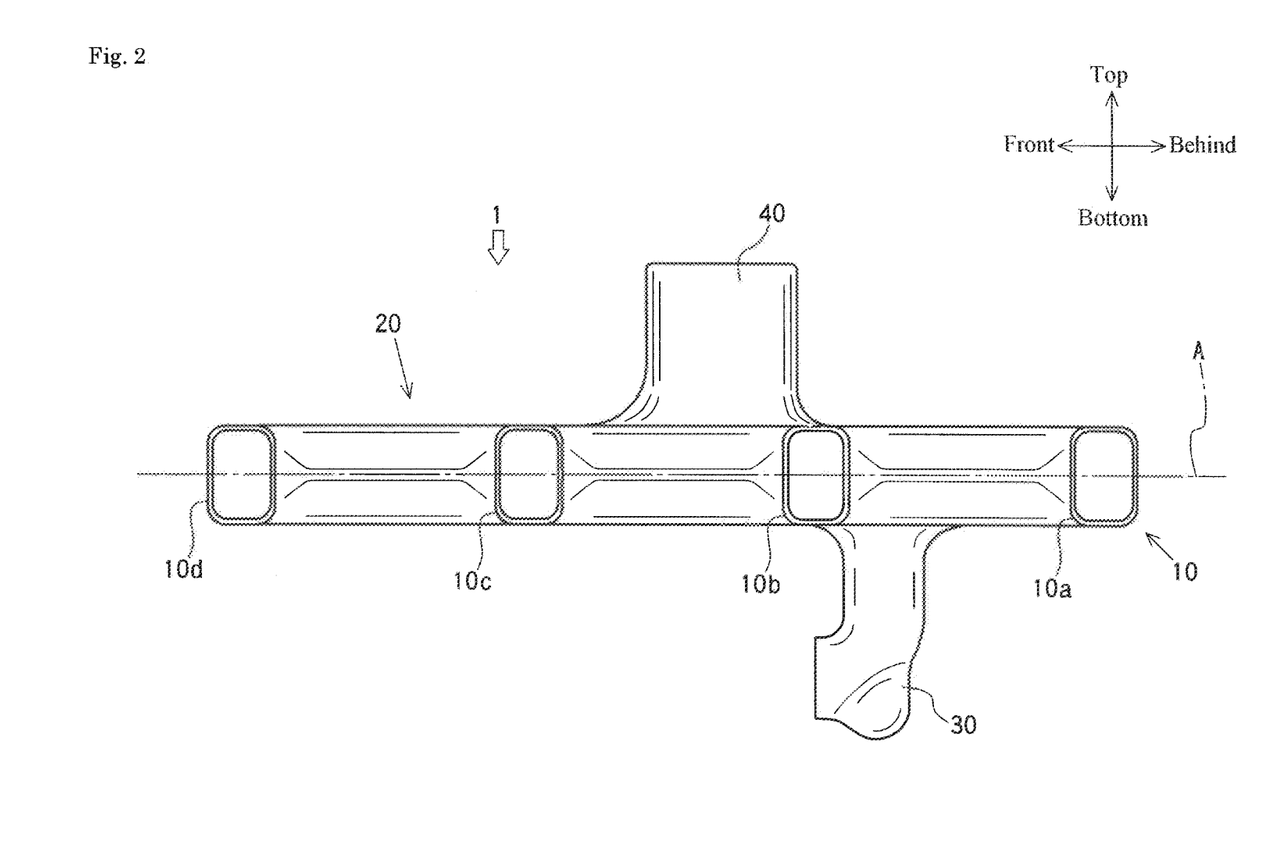
[FIG. 2] A side view of the exhaust manifold according to the first embodiment.
Figure 3:
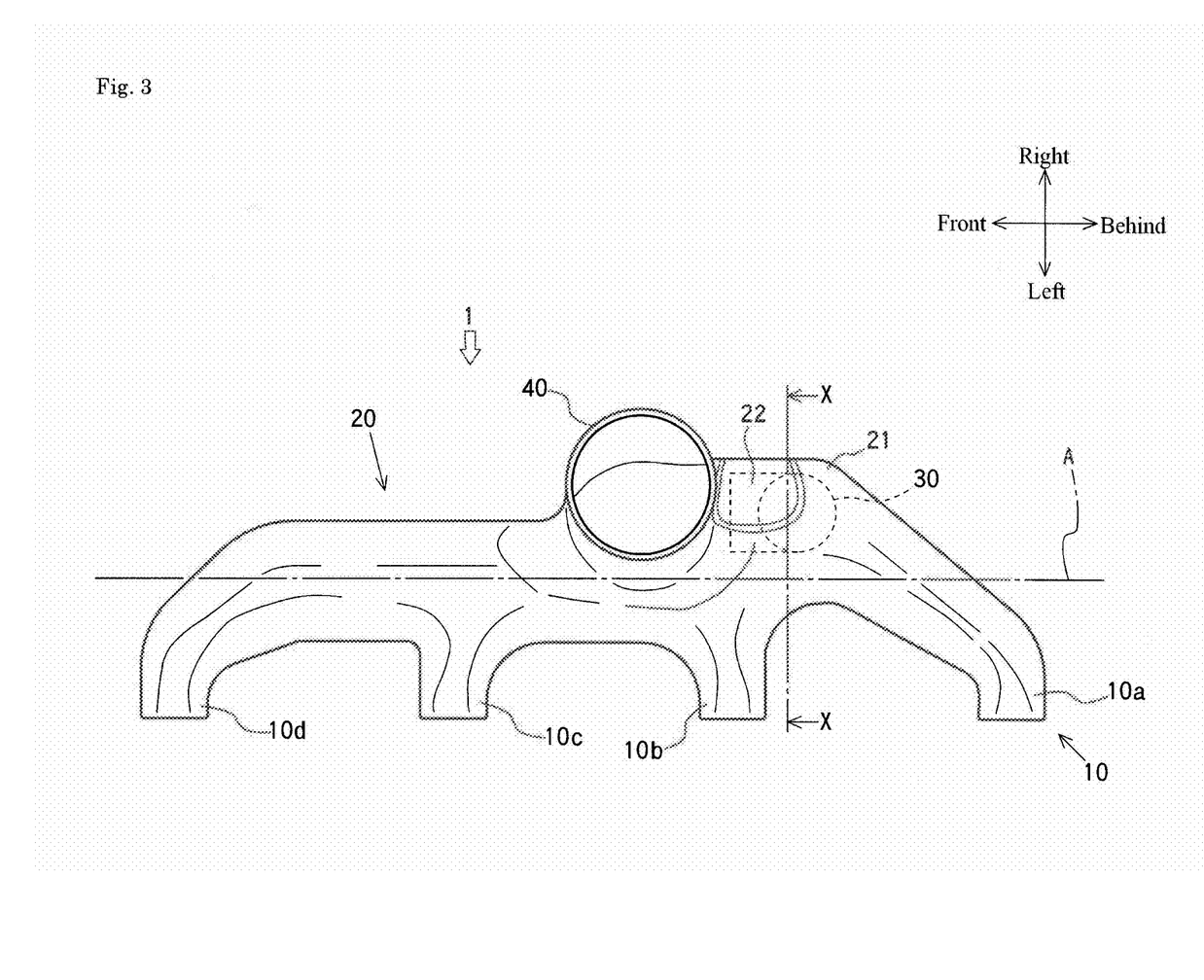
[FIG. 3] A plan view of the exhaust manifold according to the first embodiment.

As shown in FIGS. 1, 2 and 3, the exhaust manifold 1 includes a plurality of exhaust gas inlet sections 10 (in this embodiment, exhaust gas inlet sections 10a, 10b, 10c and 10d), a main pipe section 20, an EGR gas taking-out section 30 and an exhaust gas discharge section 40. The exhaust gas inlet sections 10, the main pipe section 20, the EGR gas taking-out section 30 and the exhaust gas discharge section 40 are formed integrally.

The exhaust manifold 1 is provided and connected to an exhaust port of a cylinder head fixed to an upper portion of a cylinder block, and exhaust gas discharged from the cylinders (not shown) of the engine is collected to the main pipe section 20 via the exhaust gas inlet sections 10. Then, the collected exhaust gas is discharged from the exhaust gas discharge section 40 via the DPF and a silencer to the outside, and a part of the collected exhaust gas is taken out as EGR gas from the EGR gas taking-out section 30 via an EGR pipe and supplied to an intake side.

The exhaust gas inlet sections 10 are connected to the exhaust port of the engine. The number of the exhaust gas inlet sections 10 is the same as that of the cylinders of the engine, and each of the exhaust gas inlet sections 10 is opened leftward parallel and has the same opening area as that of the cylinders. The exhaust gas inlet sections 10 are provided so that the first exhaust gas inlet section 10a, the second exhaust gas inlet section 10b, the third exhaust gas inlet section 10c and the fourth exhaust gas inlet section 10d are arranged in this order at predetermined intervals along the lengthwise direction of the main pipe section 20 from the end of the side at which the EGR gas taking-out section 30 is extendingly provided (rear side).

The exhaust gas from the cylinders of the engine via the exhaust gas inlet sections 10 (the exhaust gas inlet sections 10a, 10b, 10c and 10d) are collected in the main pipe section 20. The main pipe section 20 is pipe-like shaped and communicated with the exhaust gas inlet sections 10. When the exhaust manifold 1 is attached to the engine, the main pipe section 20 is extended in parallel to a crankshaft of the engine. The shape of the main pipe section 20 will be described later.

At the EGR gas taking-out section 30, a part of the exhaust gas collected in the main pipe section 20 is taken out as EGR gas. The EGR gas taking-out section 30 is pipe-like shaped and narrower than the main pipe section 20 and extendingly provided downward while the upper end of the EGR gas taking-out section 30 is communicated with the lower surface of the middle portion in the lengthwise direction of the main pipe section 20. In detail, as shown in FIG. 3, the EGR gas taking-out section 30 is extendingly provided downward from the position in the lower surface between the exhaust gas inlet sections 10a and 10b and close to the exhaust gas inlet section 10b and decentered (offset) rightward from an axis A in the lengthwise direction of the main pipe section 20. The lower portion of the EGR gas taking-out section 30 is curved toward the center in the lengthwise direction of the main pipe section 20, that is, forward, and the tip of the EGR gas taking-out section 30 is opened and connected to the EGR pipe (not shown).

Figure 4:
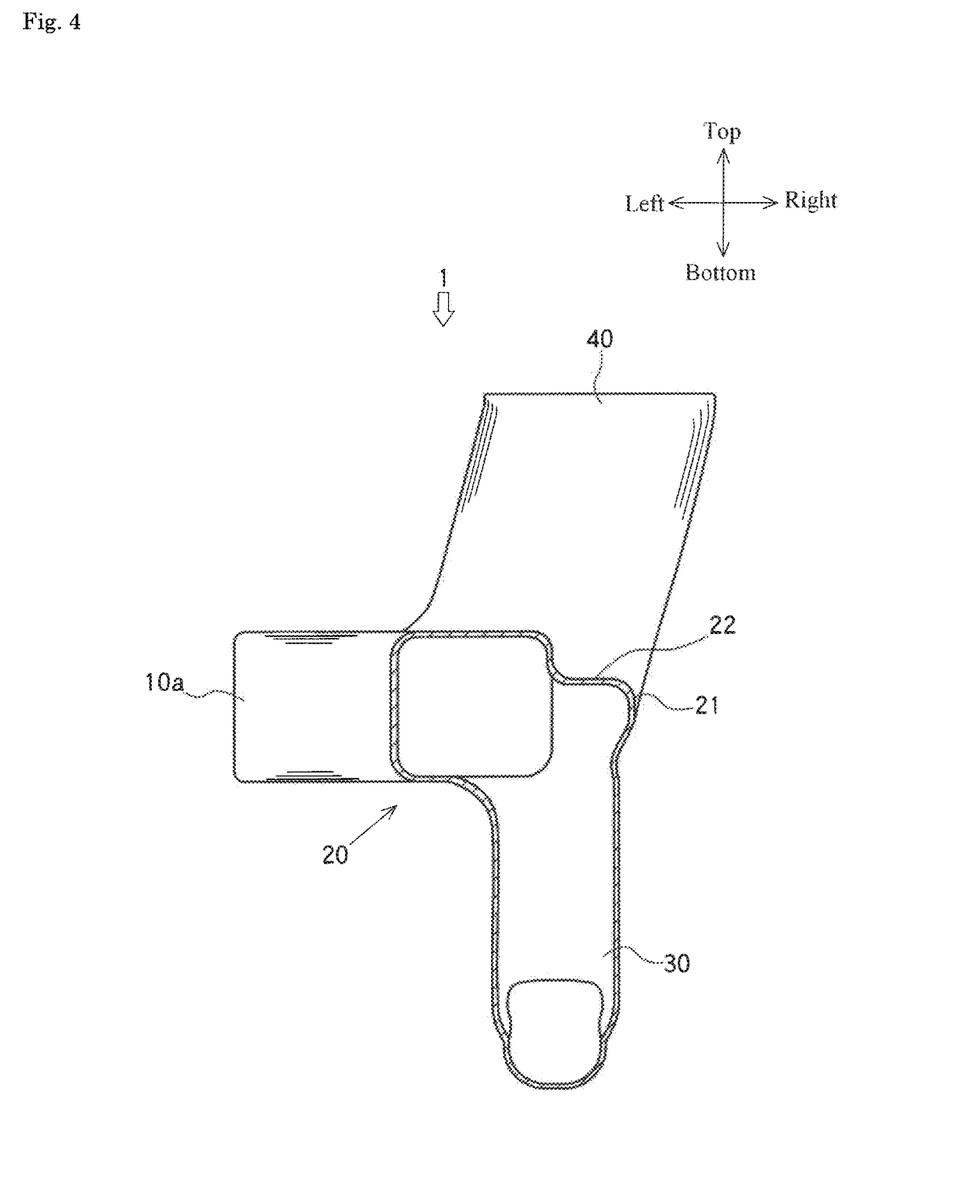
[FIG. 4] An arrow sectional view of the line X-X in FIG. 3.

In the exhaust gas discharge section 40, the exhaust gas collected in the main pipe section 20 except for the part taken out as the EGR gas is discharged to the outside of the exhaust manifold 1. The exhaust gas discharge section 40 is pipe-like shaped and thicker than the main pipe section 20, and the lower end of the exhaust gas discharge section 40 is extendingly provided slantingly upward from the upper portion of the center in the lengthwise direction of the main pipe section 20. In detail, as shown in FIGS. 3 and 4, the exhaust gas discharge section 40 is extendingly provided slantingly upward from the position in the lower surface between the exhaust gas inlet sections 10b and 10c and close to the exhaust gas inlet section 10b and decentered (offset) rightward from an axis A in the lengthwise direction of the main pipe section 20. Namely, the exhaust gas discharge section 40 is extendingly provided so as to go away from the cylinder head. The opening at the tip of the exhaust gas discharge section 40 is connected to an exhaust route having a catalytic device and a silencer (not shown). The exhaust gas discharge section 40 is projected oppositely to the projecting direction of the EGR gas taking-out section 30 when viewed in front (see FIG. 4). The center of the opening of the exhaust gas discharge section 40 is offset from the axis A in the lengthwise direction of the main pipe section 20 when viewed in plan (see FIG. 3). The EGR gas taking-out section 30 is provided symmetrically to the exhaust gas discharge section 40 about the center of the exhaust gas inlet section 10b when viewed in side (see FIG. 2).

Next, an explanation will be given on the shape of the main pipe section 20.

As shown in FIGS. 1, 2 and 3, the main pipe section 20 is pipe-like shaped by casting, and the axis A in the lengthwise direction is disposed longitudinally. At the left side of the main pipe section 20, the exhaust gas inlet sections 10a, 10b, 10c and 10d are provided.

The exhaust gas inlet sections 10a, 10b, 10c and 10d are projected leftward (along the crosswise direction) at predetermined intervals in the lengthwise direction of the main pipe section 20, and the tips thereof are opened. The center of opening of each of the exhaust gas inlet sections 10a, 10b, 10c and 10d is in agreement with the axis A in the lengthwise direction of the main pipe section 20 when viewed in side (see FIG. 2).

The front portion of the main pipe section 20 is curved rightward (oppositely to the exhaust gas inlet section 10b) at the position closer top the front side from the longitudinal center and near the exhaust gas inlet section 10b when viewed in plan (see FIG. 3) so as to form a curved section 21, and extended leftward and rearward so as to form the exhaust gas inlet section 10d. As shown in FIGS. 1 and 3, the EGR gas taking-out section 30 is extendingly provided downward from the lower portion of the curved section 21. Namely, the upper end of the EGR gas taking-out section 30 is communicated with the lower surface of the curved section 21.

By providing the curved section 21 at the middle of the route of exhaust gas from the exhaust gas inlet sections 10a, 10b, 10c and 10d via the main pipe section 20 to the exhaust gas discharge section 40, the route of exhaust gas is curved at the curved section 21 so that the exhaust gas can flow into the EGR gas taking-out section 30 easily. Since the upper opening of the EGR gas taking-out section 30 is positioned at the curved section 21 closer to the exhaust gas inlet section 10a than the part at which exhaust gas from the exhaust gas inlet section 10a joins exhaust gas from the exhaust gas inlet section 10b, whereby the exhaust gas from the exhaust gas inlet section 10a can be taken out from the EGR gas taking-out section 30 easily. Namely, the exhaust gas from the specific exhaust gas inlet section (10a) can be taken out from the EGR gas taking-out section 30 easily, whereby the exhaust gas can be taken out more stably than the case of taking out a part of exhaust gas collected in the main pipe section 20 once, and change of EGR ratio can be made small.

Furthermore, a recess 22 is formed in the upper portion of the curved section 21.

As shown in FIG. 4, the recess 22 is formed by recessing a part of the outer peripheral surface of the curved section 21 toward the inside of the main pipe section 20. Namely, the recess 22 is formed by recessing a part of the upper portion of the curved section 21 downward and leftward. Concretely, the curved section 21 is recessed substantially U-like when viewed in side and substantially L-like when viewed in front sectionally. The rear end of the curved section 21 is positioned substantially at the center of the EGR gas taking-out section 30 when viewed in plan (see FIG. 3), and the lower end of the longitudinal center of the curved section 21 is positioned above the front end of the EGR gas taking-out section 30. Furthermore the EGR gas taking-out section 30 is extendingly provided from the part of the outer peripheral surface of the curved section 21 opposite to the recess 22. The area of the recess 22 is not more than substantially half the sectional area of the main pipe section 20 not having any recess.

Since the recess 22 is formed in the upper portion of the curved section 21, the exhaust gas from the exhaust gas inlet section 10a flowing in the upper portion is curved leftward and downward by the recess 22, whereby a part of the exhaust gas can flow into the EGR gas taking-out section 30 easily.

By providing the recess 22, a part of the exhaust gas from the second exhaust gas inlet section 10b can easily join the exhaust gas from the first exhaust gas inlet section 10a and flow into the EGR gas taking-out section 30. Therefore, the exhaust gas flowing into the EGR gas taking-out section 30 is limited to the exhaust gas flowing from the specific exhaust ports, that is, the first exhaust gas inlet section 10a and the second exhaust gas inlet section 10b, whereby the change of the EGR ratio can be made small stably.

Next, an explanation will be given on an exhaust manifold 2 according to a second embodiment of the present invention.

A DPF is disposed before the exhaust manifold 2 according to the second embodiment, and the axis (lengthwise direction) of the DPF is arranged perpendicularly to an axis C of the exhaust manifold 1 (FIG. 6) (the same mode as FIG. 12(b)).

Figure 5:
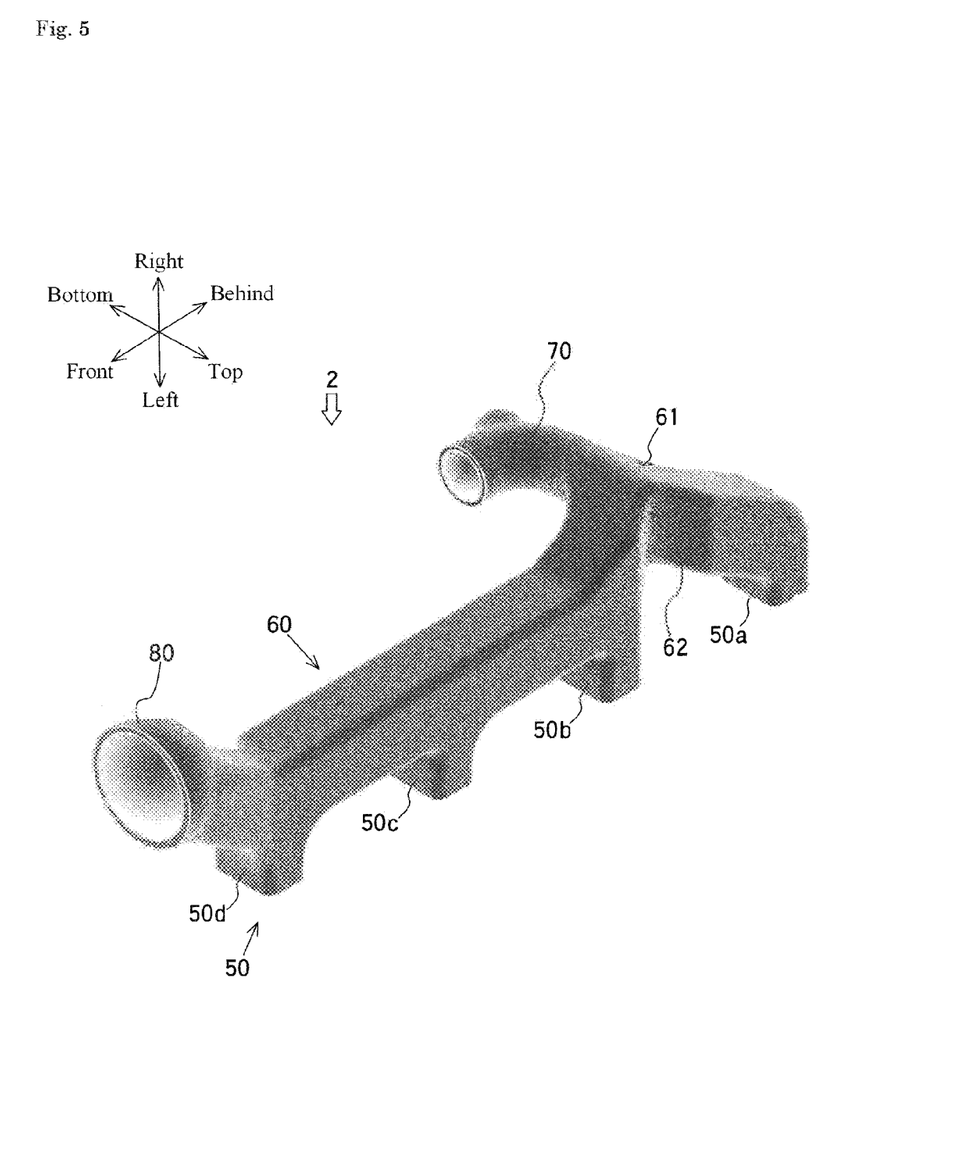
[FIG. 5] A perspective view of an exhaust manifold according to a second embodiment.
Figure 6:
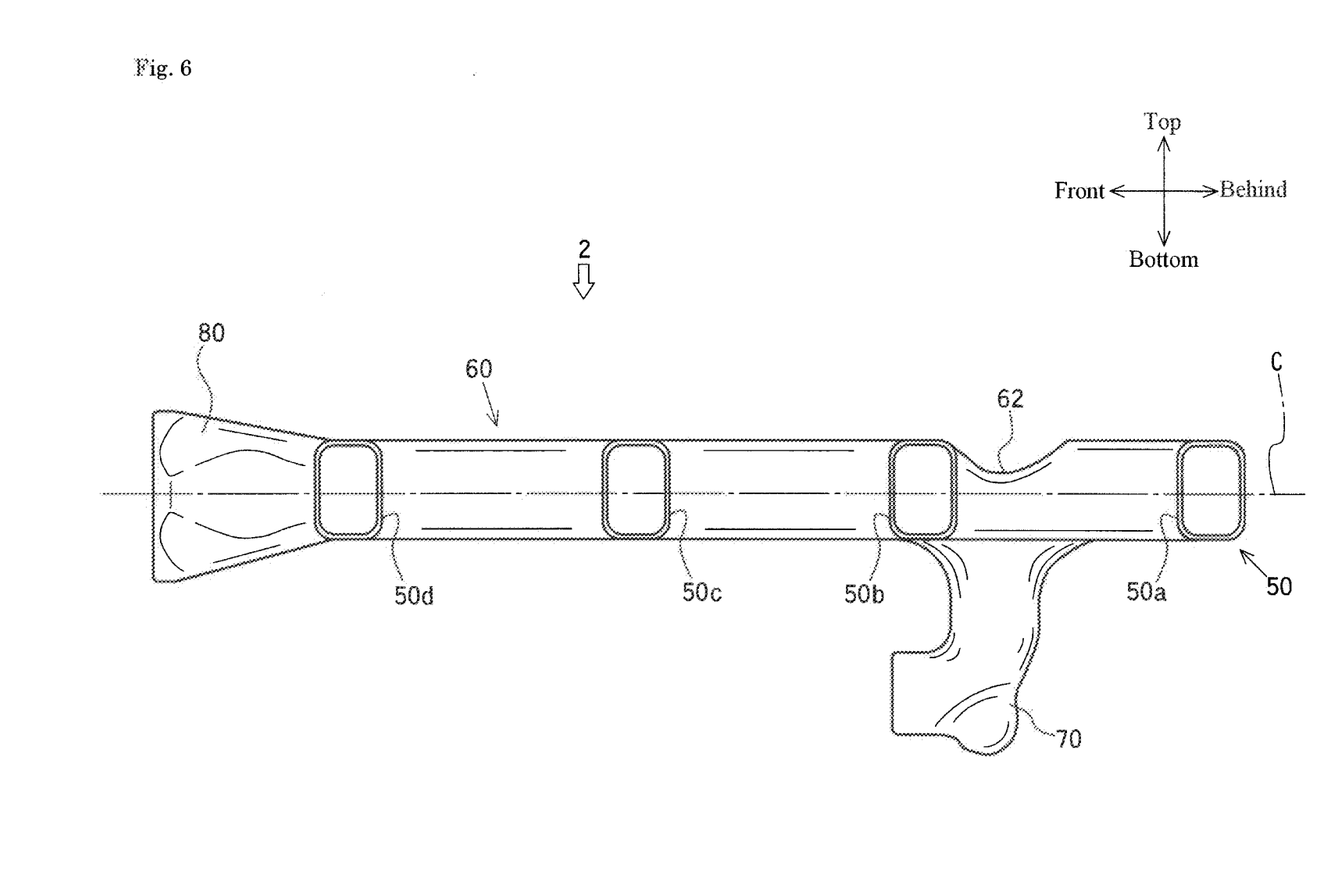
[FIG. 6] A side view of the exhaust manifold according to the second embodiment.
Figure 7:
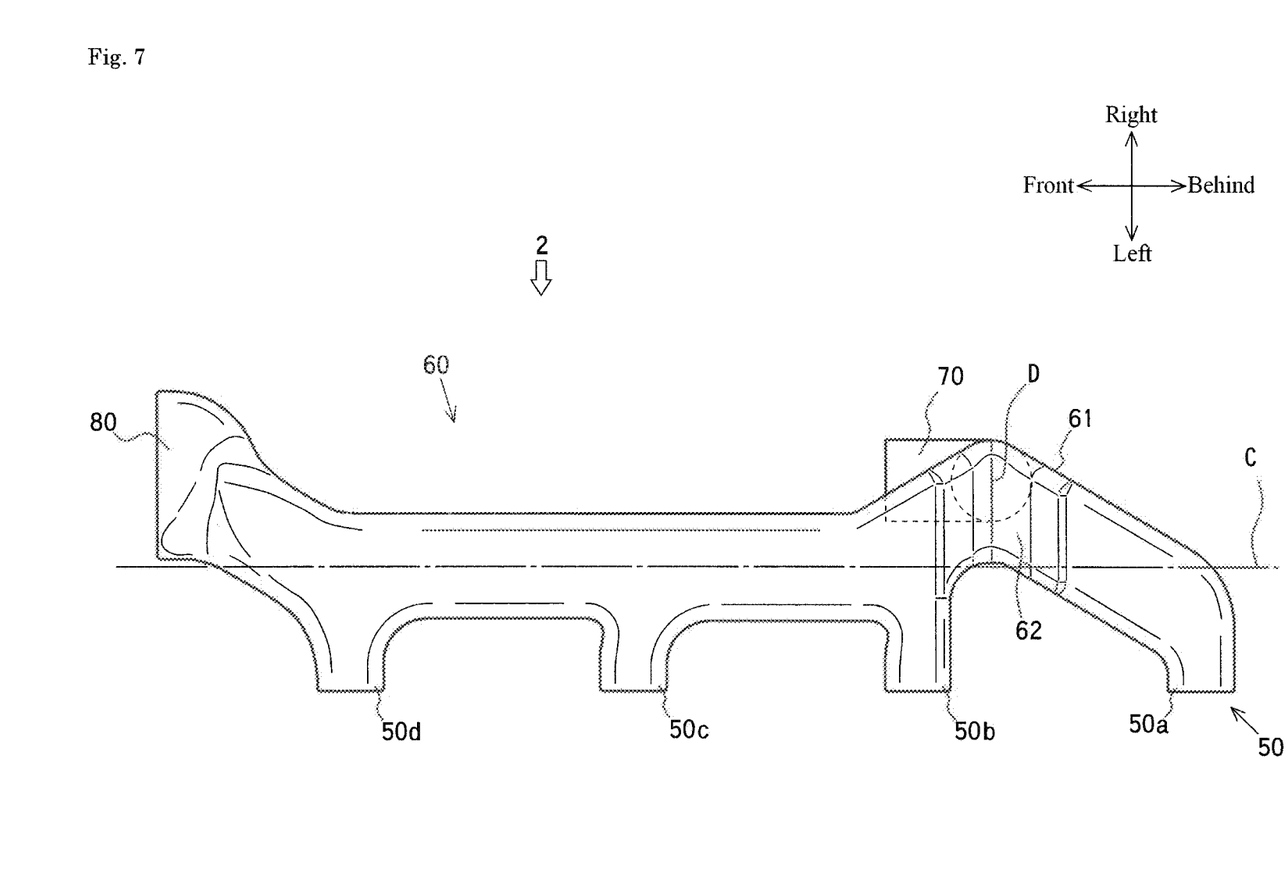
[FIG. 7] A plan view of the exhaust manifold according to the second embodiment.
Figure 8:
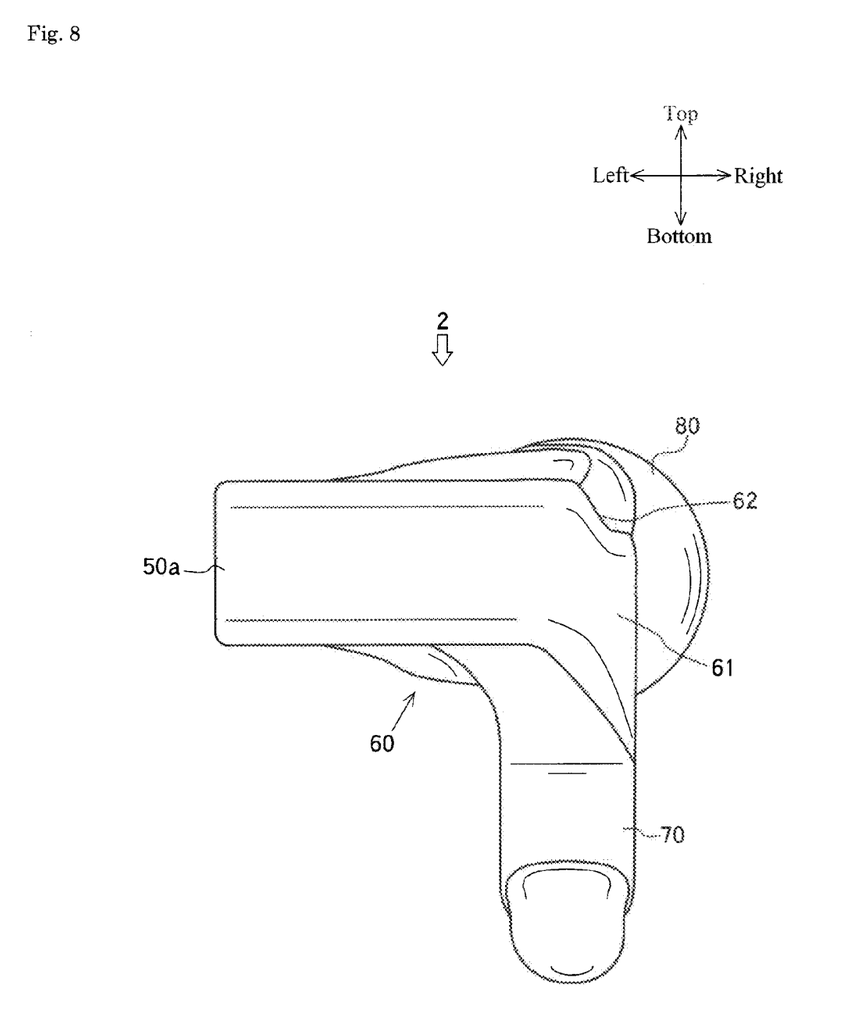
[FIG. 8] A rear view of the exhaust manifold according to the second embodiment.

As shown in FIGS. 5, 6 and 7, the exhaust manifold 2 includes a plurality of exhaust gas inlet sections 50 (in this embodiment, exhaust gas inlet sections 50a, 50b, 50c and 50d), a main pipe section 60, an EGR gas taking-out section 70 and an exhaust gas discharge section 80. The exhaust gas inlet sections 50, the main pipe section 60, the EGR gas taking-out section 70 and the exhaust gas discharge section 80 are formed integrally.

The exhaust manifold 2 is provided and connected to an exhaust port of a cylinder head fixed to an upper portion of a cylinder block, and exhaust gas discharged from the cylinders (not shown) of the engine is collected to the main pipe section 60 via the exhaust gas inlet sections 50. Then, the collected exhaust gas is discharged from the exhaust gas discharge section 80 via the DPF and a silencer to the outside, and a part of the collected exhaust gas is taken out as EGR gas from the EGR gas taking-out section 70 via an EGR pipe and supplied to an intake side.

The exhaust gas inlet sections 50 are connected to the exhaust port of the engine. The number of the exhaust gas inlet sections 50 is the same as that of the cylinders of the engine, and each of the exhaust gas inlet sections 50 is opened leftward parallel and has the same opening area as that of the cylinders. The exhaust gas inlet sections 50 are provided so that the first exhaust gas inlet section 50a, the second exhaust gas inlet section 50b, the third exhaust gas inlet section 50c and the fourth exhaust gas inlet section 50d are arranged in this order at predetermined intervals along the lengthwise direction of the main pipe section 60 from the end of the side at which the EGR gas taking-out section 70 is extendingly provided (rear side).

The exhaust gas from the cylinders of the engine via the exhaust gas inlet sections 50 (the exhaust gas inlet sections 50a, 50b, 50c and 50d) are collected in the main pipe section 60. The main pipe section 60 is pipe-like shaped and communicated with the exhaust gas inlet sections 50. When the exhaust manifold 2 is attached to the engine, the main pipe section 60 is extended in parallel to a crankshaft of the engine. The shape of the main pipe section 60 will be described later.

At the EGR gas taking-out section 70, a part of the exhaust gas collected in the main pipe section 60 is taken out as EGR gas. The EGR gas taking-out section 70 is pipe-like shaped and narrower than the main pipe section 60 and extendingly provided downward while the upper end of the EGR gas taking-out section 70 is communicated with the lower surface of the middle portion in the lengthwise direction of the main pipe section 60. In detail, as shown in FIG. 7, the EGR gas taking-out section 70 is extendingly provided downward from the position in the lower surface between the exhaust gas inlet sections 50a and 50b and close to the exhaust gas inlet section 50b and decentered (offset) rightward from an axis C in the lengthwise direction of the main pipe section 60. The lower portion of the EGR gas taking-out section 70 is curved toward the center in the lengthwise direction of the main pipe section 60, that is, forward, and the tip of the EGR gas taking-out section 70 is opened and connected to the EGR pipe (not shown).

In the exhaust gas discharge section 80, the exhaust gas collected in the main pipe section 60 except for the part taken out as the EGR gas is discharged to the outside of the exhaust manifold 2. The exhaust gas discharge section 80 is pipe-like shaped and thicker than the main pipe section 60 and communicated with the front end of the main pipe section 60. In detail, the exhaust gas discharge section 80 is to the end of the main pipe section 60 at the side (front side) opposite to the side at which the EGR gas taking-out section 70 is provided (rear side) in the lengthwise direction, and is extendingly provided rightward and forward from the basal portion of the fourth exhaust gas inlet section 50d. The tip of the exhaust gas discharge section 80 is opened forward and connected to an exhaust route having a catalytic device (DPF) and a silencer (not shown). The exhaust gas discharge section 80 is extendingly provided aslant from the front end of the main pipe section 60 so as to go away from the cylinder head when viewed in plan (see FIG. 7), and the center of the opening is offset from the axis C in the lengthwise direction of the main pipe section 60. The center of the opening of the exhaust gas discharge section 80 is arranged on the extension of the axis C in the lengthwise direction of the main pipe section 60 when viewed in side (see FIG. 6).

As mentioned above, by offsetting the center of the opening of the exhaust gas discharge section 80 from the axis C in the lengthwise direction of the main pipe section 60, average exhaust pressure in the exhaust manifold 2 can be fixed.

Next, an explanation will be given on the shape of the main pipe section 60.

As shown in FIGS. 5, 6 and 7, the main pipe section 60 is pipe-like shaped, and the axis C in the lengthwise direction is disposed longitudinally. At the left side of the main pipe section 60, the exhaust gas inlet sections 50a, 50b, 50c and 50d are provided.

The exhaust gas inlet sections 50a, 50b, 50c and 50d are projected leftward (along the crosswise direction) at predetermined intervals in the lengthwise direction of the main pipe section 60, and the tips thereof are opened. The center of opening of each of the exhaust gas inlet sections 50a, 50b, 50c and 50d is in agreement with the axis C in the lengthwise direction of the main pipe section 60 when viewed in side (see FIG. 6).

As shown in FIG. 7, a curved section 61 is formed in the rear portion of the main pipe section 60. The curved section 61 is disposed oppositely to the exhaust gas discharge section 80, between the first exhaust gas inlet section 50a and the second exhaust gas inlet section 50b and closely to the second exhaust gas inlet section 50b so as to be curved and projected rightward (oppositely to the opening of the exhaust gas inlet section 50, that is, oppositely to the cylinder block). Namely, the curved section 61 is formed by curving the rear portion of the main pipe section 60 L-like when viewed in plan. The curved section 61 is offset rightward from the axis C in the lengthwise direction of the main pipe section 60.

The upper end of the EGR gas taking-out section 70 is communicated with the lower surface of the curved section 61.

By providing the EGR gas taking-out section 70 in the curved section 61 as mentioned above, exhaust gas flowing from the first exhaust gas inlet section 50a is directed mainly leftward by touching the curved section 61, and a part of the exhaust gas is directed downward. Accordingly, the exhaust gas flowing from the first exhaust gas inlet section 50a is apt to flow into the EGR gas taking-out section 70.

Since exhaust gas flowing from the second exhaust gas inlet section 50b flows oppositely to the exhaust gas flowing from the first exhaust gas inlet section 50a, the exhaust gas flowing from the second exhaust gas inlet section 50b joins the exhaust gas flowing from the first exhaust gas inlet section 50a and flows toward the exhaust gas discharge section 80 along the direction of the main flow.

Therefore, the exhaust gas flowing into the EGR gas taking-out section 70 is limited to the exhaust gas flowing from the specific exhaust port, that is, the first exhaust gas inlet section 50a, whereby the change of the EGR ratio can be made small stably, Furthermore, a recess 62 is formed in the upper portion of the curved section 61.

As shown in FIG. 6, the recess 62 is formed by recessing a part of the outer peripheral surface of the curved section 61 toward the inside of the main pipe section 60. The recess 62 is formed between the first exhaust gas inlet section 50a and the second exhaust gas inlet section 50b and closely to the second exhaust gas inlet section 50b so that the upper surface of the recess 62 is substantially V-like shaped when viewed in side. As shown in FIG. 7, a valley line D which is the lower end of the recess 62 passes through the center of the inlet opening of the EGR gas taking-out section 70 when viewed in plan. Namely, the EGR gas taking-out section 70 is extendingly provided from a part of the outer peripheral surface of the curved section 61 opposite to the recess 62.

By providing the recess 62 in the curved section 61 as mentioned above, the exhaust gas flowing from the first exhaust gas inlet section 50a is directed downward by the recess 62, whereby a part of the exhaust gas is apt to flow into the EGR gas taking-out section 70.

By providing the recess 62, a part of the exhaust gas flowing from the second exhaust gas inlet section 50b is apt to join the exhaust gas flowing from the first exhaust gas inlet section 50a and flow into the EGR gas taking-out section 70. Therefore, the exhaust gas flowing into the EGR gas taking-out section 70 is limited to the exhaust gas flowing from the specific exhaust ports, that is, the first exhaust gas inlet section 50a and the second exhaust gas inlet section 50b, whereby the change of the EGR ratio can be made small stably.

Next, an explanation will be given on the EGR ratio of each of the exhaust manifold 1 according to the first embodiment and the exhaust manifold 2 according to the second embodiment of the present invention.

Firstly, an explanation will be given on a conventional exhaust manifold 100 fir comparing the EGR ratio of each of the exhaust manifold 1 and the exhaust manifold 2.

Figure 9:
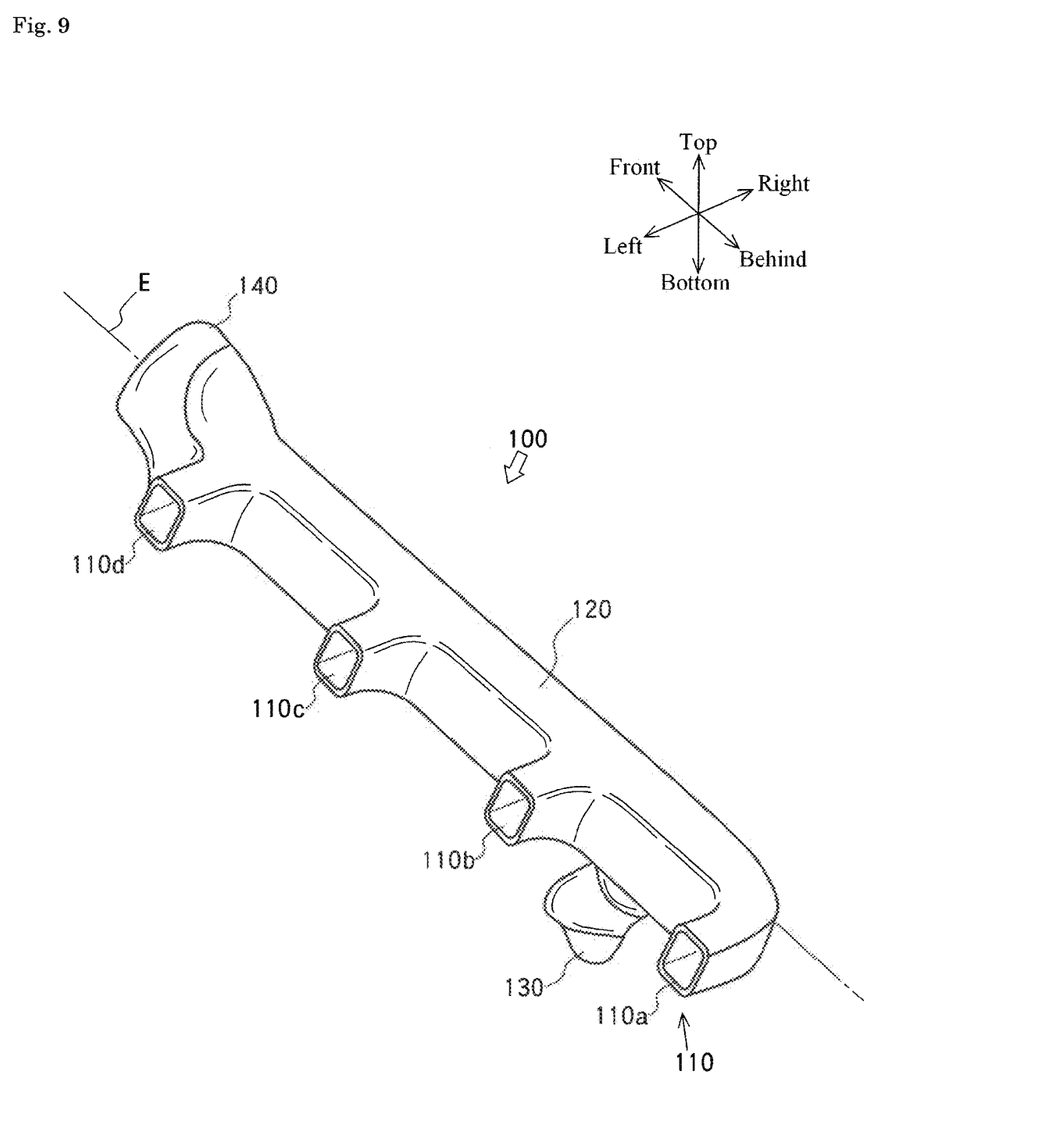
[FIG. 9] A perspective view of a conventional exhaust manifold.

As shown in FIG. 9, similarly to the exhaust manifold 1 and the exhaust manifold 2, the conventional exhaust manifold 100 includes a plurality of exhaust gas inlet sections 110 (in this embodiment, exhaust gas inlet sections 110a 110b, 110c and 110d) communicated with the exhaust ports of the engine (not shown), a main pipe section 120 collecting the exhaust gas flowing from the exhaust gas inlet sections 110, an EGR gas taking-out section 130 taking out a part of the exhaust gas collected in the main pipe section 120 as EGR gas, and an exhaust gas discharge section 140 discharging the exhaust gas collected in the main pipe section 120 except for the exhaust gas taken out as the EGR gas to the outside of the exhaust manifold 100.

The main pipe section 120 does not have such recess and curved section that the exhaust manifold 1 and the exhaust manifold 2 have, and is straight pipe-like shaped. At one of the ends of the main pipe section 120, the exhaust gas discharge section 140 is provided coaxially to an axis E in the lengthwise direction of the main pipe section 120, and the EGR gas taking-out section 130 is provided in the lower portion of the main pipe section 120 opposite to the exhaust gas discharge section 140.

Figure 10:
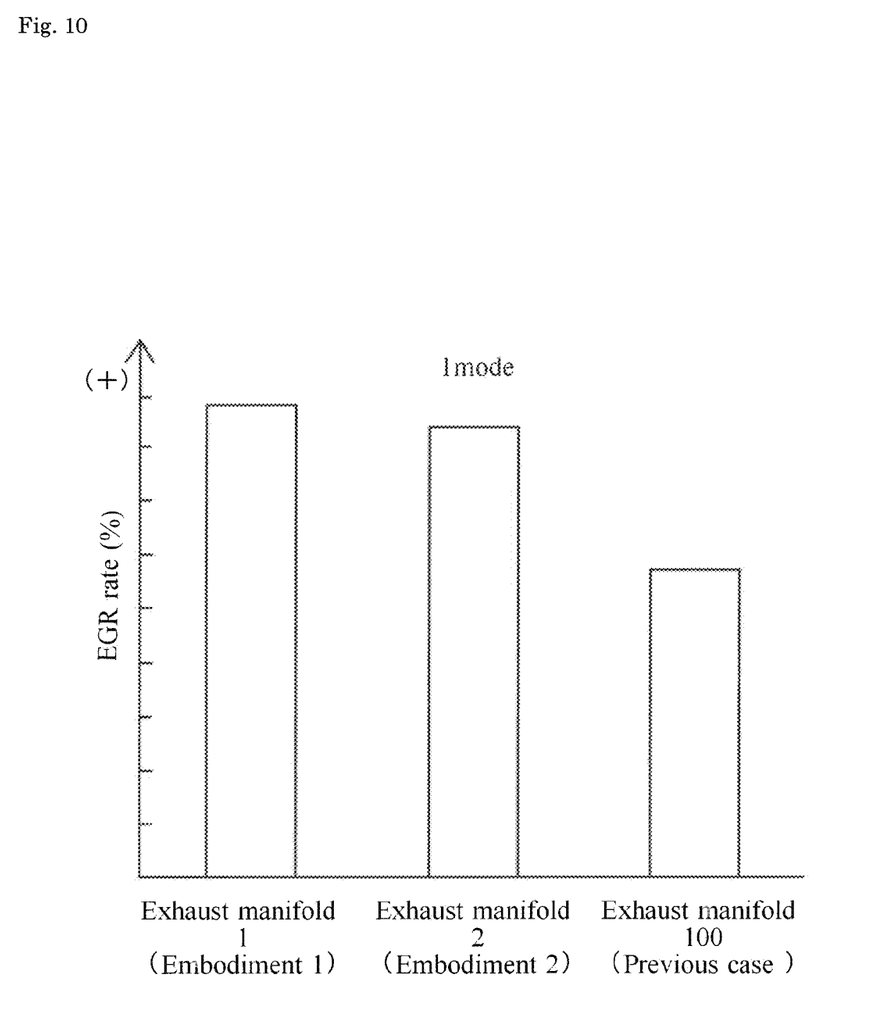
[FIG. 10] A graph of EGR ratios of the exhaust manifold according to the first embodiment, the exhaust manifold according to the second embodiment and the conventional exhaust manifold when a driving condition of a multi-cylinder internal combustion engine is 1mode.
Figure 11:
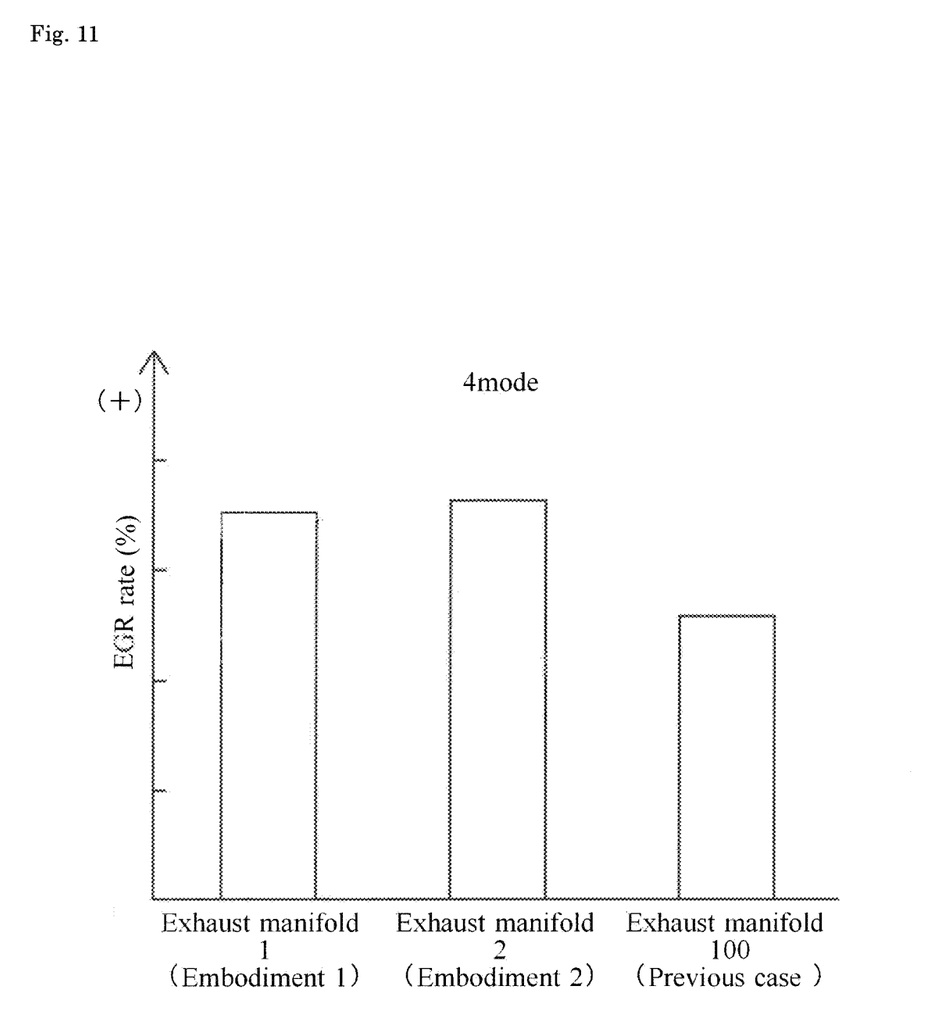
[FIG. 11] A graph of EGR ratios of the exhaust manifold according to the first embodiment, the exhaust manifold according to the second embodiment and the conventional exhaust manifold when the driving condition of the multi-cylinder internal combustion engine is 4mode.

When the conventional exhaust manifold 100, the exhaust manifold 1 and the exhaust manifold 2 are operated under driving conditions determined by regulation of exhaust gas (1mode and 4mode), the EGR ratio is improved as shown in FIGS. 10 and 11.

As mentioned above, each of the exhaust manifold 1 and the exhaust manifold 2 includes the exhaust gas inlet sections (the exhaust gas inlet sections 10, the exhaust gas inlet sections 50) connected to the exhaust ports of the cylinders of the engine, the main pipe section (the main pipe section 20, the main pipe section 60) communicated with the exhaust gas inlet sections and collecting exhaust gas flowing from the exhaust gas inlet sections, the EGR gas taking-out section (the EGR gas taking-out section 30, the EGR gas taking-out section 70) taking out a part of the collected exhaust gas as EGR gas, and the exhaust gas discharge section (the exhaust gas discharge section 40, the exhaust gas discharge section 80) discharging the other part of the exhaust gas. In the main pipe section, the curved section (the curved section 21, the curved section 61) projectingly curved oppositely to the exhaust gas inlet sections is formed between the exhaust gas inlet sections. In the curved section, the recess (the recess 22, the recess 62) is formed by recessing a part of the outer peripheral surface of the curved section toward the inside of the main pipe section. The EGR gas taking-out section is extendingly provided from the part of the outer peripheral surface opposite to the recess. The center of the inlet opening of the EGR gas taking-out section is offset from the axis in the lengthwise direction of the main pipe section.

According to the construction of the exhaust manifold 1 and the exhaust manifold 2, the exhaust gas flowing into the EGR gas taking-out section is limited to the exhaust gas flowing from the specific exhaust ports. Accordingly, when the position of the exhaust gas discharge section in the exhaust manifold is changed and the shape of the exhaust manifold is changed, the change of the EGR ratio by the change of flow of the exhaust gas caused by the shape of the exhaust manifold can be reduced. Therefore, the EGR ratio is fixed regardless of the change of the shape of the exhaust manifold, whereby it is not necessary to change the EGR ratio control program though the shape of the exhaust manifold is changed. The exhaust manifold can be selected following the loaded position of the DPF in the internal combustion engine without changing the EGR ratio.

In the exhaust manifold 1 and the exhaust manifold 2, the center of the opening of the exhaust gas discharge section (the exhaust gas discharge section 40, the exhaust gas discharge section 80) is offset from the axis in the lengthwise direction of the main pipe section (the main pipe section 20, the main pipe section 60)

According to the construction of the exhaust manifold 1 and the exhaust manifold 2, the average exhaust pressure in the exhaust manifold can be fixed. Accordingly, the change of the amount of the EGR gas caused by the discharge direction of the exhaust gas can be reduced, whereby the amount of the EGR gas taken out from the EGR gas taking-out section can be stabilized regardless of the change of the shape of the exhaust manifold (the change of the position of the exhaust gas discharge section in the exhaust manifold).

Furthermore, in the construction of the exhaust manifold 1, the exhaust gas discharge section 40 is provided at the center in the lengthwise direction of the main pipe section 20.

According to the construction of the exhaust manifold 1, the average exhaust pressure in the exhaust manifold can be fixed. Accordingly, the change of the amount of the EGR gas caused by the discharge direction of the exhaust gas can be reduced, whereby the amount of the EGR gas taken out from the EGR gas taking-out section can be stabilized.

Furthermore, in the construction of the exhaust manifold 2, the exhaust gas discharge section 80 is provided at the end of the main pipe section 60 oppositely to the EGR gas taking-out section 70.

According to the construction of the exhaust manifold 2, the average exhaust pressure in the exhaust manifold can be fixed. Accordingly, the change of the amount of the EGR gas caused by the discharge direction of the exhaust gas can be reduced, whereby the amount of the EGR gas taken out from the EGR gas taking-out section can be stabilized.

INDUSTRIAL APPLICABILITY

The present invention can be employed for an engine having an EGR (Exhaust Gas Recirculation), especially an engine having a DPF (Diesel Particulate Filter).

The invention claimed is:
1. An exhaust manifold comprising:
   exhaust gas inlet sections connected to exhaust ports of cylinders of an engine;
   a main pipe section communicated with the exhaust gas inlet sections and collecting exhaust gas flowing from the exhaust gas inlet sections;
   an EGR gas taking-out section taking out a part of the collected exhaust gas as EGR gas; and an exhaust gas discharge section discharging the other part of the exhaust gas, wherein in the main pipe section has a curved section projectingly curved opposite to the exhaust gas inlet sections and the curved section is formed between a first exhaust gas inlet section located at an end part of the exhaust manifold and a second exhaust gas inlet section next to the first exhaust gas inlet section, wherein the curved section has a recess formed by recessing a part of an outer peripheral surface of the curved section toward an inside of the main pipe section, and the EGR gas taking-out section extends from a part of the outer peripheral surface opposite to the recess, wherein a center of an inlet opening of the EGR gas taking-out section is offset from an axis in a lengthwise direction of the main pipe section, and wherein the EGR gas taking-out section, the recess and the exhaust gas discharge section are arranged in this order.

2. The exhaust manifold according to claim 1, wherein a center of an opening of the exhaust gas discharge section is offset from the axis in the lengthwise direction of the main pipe section.

3. The exhaust manifold according to claim 2, wherein the exhaust gas discharge section is provided at a center in the lengthwise direction of the main pipe section.

4. The exhaust manifold according to claim 2, wherein the exhaust gas discharge section is provided at an end of the main pipe section oppositely to the EGR gas taking-out section.

* * * * *